United States Patent Office 3,010,993
Patented Nov. 28, 1961

3,010,993
THYROMIMETIC AMINO ACIDS
Eugene C. Jorgensen, San Francisco, Calif., assignor to The Regents of the University of California, Berkeley, Calif., a corporation of California
No Drawing. Filed Sept. 2, 1958, Ser. No. 758,544
6 Claims. (Cl. 260—519)

This invention relates to novel dialkyl substituted phenylalanines. More specifically, it relates to 4-(2,3-dialkylphenoxy)-3,5-diiodophenylalanines which possess pharmacodynamic activity, particularly for treating endocrinopathic conditions.

The compounds of this invention unexpectedly possess thyromimetic activity. The prior art teaches that the 2,4-dimethyl isomer of these compounds is a thyroid antagonist. It is, therefore, highly surprising that the new 2,3-dimethyl congeners of this invention would possess biological activity which is the opposite of that of the prior art compound.

The novel compounds of this invention are represented by the following basic structural formula:

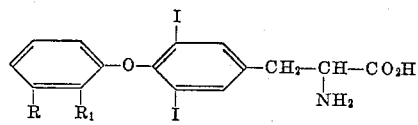

in which R and $R_1$ represent a lower alkyl of from 1 to 3 carbons, preferably methyl.

While these amino acids are stable and useful as such, it will be recognized that in common with other amino acids either nontoxic acid addition salts with strong, pharmaceutically acceptable organic or inorganic acids, such as tartaric, chloroacetic, ethanedisulfonic, hydrochloric, sulfuric or phosphoric, or nontoxic, pharmaceutically acceptable salts with strong bases, such as ammonium hydroxide, trimethylamine, or, preferably, an alkali metal hydroxide, for instance, sodium or potassium hydroxide, are fully equivalent to the amino acid parent and may, in certain cases even be preferred. The salts are prepared conveniently by dissolving the amino acid in a dilute aqueous solution of the acid or base with heat then cooling to separate the desired salt. Alternatively, more conventional methods known to the art can be used.

The DL form of these compounds is most readily obtained, however, the individual D and L isomers have demonstrable activity. The L-isomeric form is particularly advantageous as compared with the D form.

The starting material for preparing the compounds of this invention in either the DL or L series is the known N-acetyl-3,5-dinitro-4-toluene-p-sulfonyloxyphenylalanine ethyl ester. The pyridinium tosylate is made from this intermediate. This crude intermediate is then reacted with various 2,3-dialkylphenols by heating at reflux in an unreactive organic solvent, such as a halogenated alkane, for instance, chloroform or carbon tetrachloride to give the 2,3-alkylated phenoxy compound. The nitro groups are reduced, preferably catalytically with a palladium catalyst, then converted to iodo groups through the tetrazonium intermediates to form the 4-(2,3-dialkylphenoxy)-3,5-diiodophenylalanine N-acetyl ethyl esters, which, in turn, are hydrolyzed to the desired amino acids preferably by heating at reflux in a mixture of hydrochloric acid and acetic acid.

The following examples are illustrative of the preparation of the compounds of this invention and are not meant to limit the scope of this invention.

Example 1

A mixture of N-acetyl-3,5-dinitro-4-toluene-p-sulfonyloxy-DL-phenylalanine ethyl ester (0.06 mole) and dry pyridine (0.2 mole) in 90 ml. of dry chloroform is heated at reflux for 30 minutes. 2,3-dimethylphenol (0.42 mole) is added and the mixture is heated at reflux for six hours. The cooled mixture is washed successively with 2 N hydrochloric acid, 2 N sodium hydroxide and water. The solvent is removed. The residue is taken up in chloroform and put through activated alumina. The first eluate is evaporated and the residue therefrom recrystallized from ethanol to give N-acetyl-4-(2,3-dimethylphenoxy)-3,5-dinitro-DL-phenylalanine ethyl ester.

This compound (0.02 mole) in 30 ml. of glacial acetic acid is shaken with 2.0 g. of 10% palladium-on-charcoal in a hydrogen atmosphere (30 p.s.i.) for 45 minutes. Concentrated sulfuric acid (15 ml.) is added. The catalyst is removed and the filtrate added over two hours to an aqueous solution of 0.081 mole of nitrosylsulfuric acid at −5° C. After stirring for two hours at −5° C., a mixture of iodine (0.07 mole) and sodium iodine (0.08 mole) in 300 ml. of water and 300 ml. of chloroform is added. The chloroform layer is separated, washed successively with 10% sodium bisulfite solution, bicarbonate and water. The solvent is removed to give N-acetyl-4-(2,3-dimethylphenoxy)-3,5-diiodo-DL-phenylalanine ethyl ester as crystals from ethanol.

This ester (.0041 mole) in 25 ml. of glacial acetic acid and 25 ml. of concentrated hydrochloric acid is heated at reflux for three hours. The pH is adjusted to 5.0 to separate the desired 4-(2,3-dimethylphenoxy)-3,5-diiodo-DL-phenylalanine, M.P. 197–199° C.

Example 2

The procedure of Example 1 is followed in the same quantities but using 0.3 mole of 2-isopropyl-3-methyl phenol. The product obtained is 4-(2-isopropyl-3-methylphenoxy)-3,5-diiodo-DL-phenylalanine.

Example 3

The procedure of Example 1 using 0.4 mole of 2,3-diethylphenol yields 4-(2,3-diethylphenoxy)-3,5-diiodo-DL-phenylalanine.

Example 4

The procedure of Example 1 using 0.4 mole of 2,3-dimethylphenol and 0.06 mole of N-acetyl-3,5-dinitro-4-toluene-p-sulfonyloxy-L-phenylalanine ethyl ester gives 4-(2,3-dimethylphenoxy)-3,5-diiodo-L-phenylalanine.

Example 5

4-(2,3-dimethylphenoxy)-3,5-diiodo-L-phenylalanine (200 mg.) is dissolved in 5 ml. of 2% sodium carbonate solution with heating on the steam bath. Cooling separates the solid sodium salt of the amino acid. Two percent sodium hydroxide or potassium hydroxide solution can also be used.

The corresponding DL-amino acid (100 mg.) is dissolved in a minimum of 5% hydrochloric acid on the steam bath. Cooling separates the hydrochloride salt.

What is claimed is:

1. A chemical compound of the class consisting of an amino acid and its nontoxic, pharmaceutically acceptable salts selected from the group consisting of ammonium, trimethylammonium, alkali metal and acid addition salts with strong pharmaceutically acceptable acids, the amino acid having the structural formula:

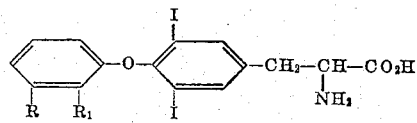

in which R and $R_1$ are lower alkyl of from 1 to 3 carbons.

2. 4-(2,3-dimethylphenoxy)-3,5-diiodo-DL-phenylalanine.

3. 4-(2,3-dimethylphenoxy)-3,5-diiodo-L-phenylalanine.
4. 4-(2,3-diethylphenoxy)-3,5-diiodo-DL-phenylalanine.
5. 4-(2-isopropyl-3-methylphenoxy)-3,5-diiodo-DL-phenylalanine.
6. The sodium salt of 4-(2,3-dimethylphenoxy)-3,5-diiodo-L-phenylalanine.

References Cited in the file of this patent

Barnes et al.: Chem. Absts., vol. 48, columns 4478–4481 (1954).

Selenkow et al.: Physiological Reviews, vol. 35, pgs. 426–474 (1955).